United States Patent
Mehr et al.

(10) Patent No.: US 11,631,221 B2
(45) Date of Patent: Apr. 18, 2023

(54) AUGMENTING A VIDEO FLUX OF A REAL SCENE

(71) Applicant: DASSAULT SYSTEMES, Vélizy-Villacoublay (FR)

(72) Inventors: Eloi Mehr, Vélizy-Villacoublay (FR); Vincent Guitteny, Vélizy-Villacoublay (FR)

(73) Assignee: DASSAULT SYSTEMES, Vélizy-Villacoublay (FR)

( * ) Notice: Subject to any disclaimer, the term of this patent is extended or adjusted under 35 U.S.C. 154(b) by 0 days.

(21) Appl. No.: 17/138,259

(22) Filed: Dec. 30, 2020

(65) Prior Publication Data
US 2021/0201587 A1 Jul. 1, 2021

(30) Foreign Application Priority Data
Dec. 31, 2019 (EP) .................................. 19306795

(51) Int. Cl.
G06T 19/00 (2011.01)
G06T 7/73 (2017.01)
G06K 9/62 (2022.01)

(52) U.S. Cl.
CPC .......... G06T 19/006 (2013.01); G06K 9/6232 (2013.01); G06T 7/75 (2017.01); *G06T 2207/10016* (2013.01)

(58) Field of Classification Search
CPC ........... G06K 9/6232; G06T 7/70; G06T 7/73; G06T 7/75; G06T 19/006; G06T 2207/10016
See application file for complete search history.

(56) References Cited

U.S. PATENT DOCUMENTS

| | | | |
|---|---|---|---|
| 8,873,798 B2 * | 10/2014 | Tsagkatakis | G06K 9/6255 382/209 |
| 2016/0180546 A1 * | 6/2016 | Kim | G06T 7/248 382/103 |
| 2018/0101227 A1 | 4/2018 | Frueh et al. | |

(Continued)

OTHER PUBLICATIONS

Bay et al., "Wide-Baseline Stereo Matching with Line Segments", 2005 IEEE Computer Society Conference on Computer Vision and Pattern Recognition (CVPR'05),1063-6919/05 (Year: 2005).*

(Continued)

*Primary Examiner* — Diane M Wills
(74) *Attorney, Agent, or Firm* — Oblon, McClelland, Maier & Neustadt, L.L.P.

(57) ABSTRACT

A computer-implemented method of augmented reality includes capturing the video flux with a video camera, extracting, from the video flux, one or more 2D images each representing the real object, and obtaining a 3D model representing the real object. The method also includes determining a pose of the 3D model relative to the video flux, among candidate poses. The determining rewards a mutual information, for at least one 2D image and for each given candidate pose, which represents a mutual dependence between a virtual 2D rendering and the at least one 2D image. The method also includes augmenting the video flux based on the pose. This forms an improved solution of augmented reality for augmenting a video flux of a real scene including a real object.

22 Claims, 5 Drawing Sheets

(56) References Cited

U.S. PATENT DOCUMENTS

2018/0137651 A1* 5/2018 Levinshtein ............. G06T 7/75
2020/0082209 A1* 3/2020 Liu ..................... G06K 9/6857

OTHER PUBLICATIONS

Crivellaro, Alberto, et al. "A novel representation of parts for accurate 3D object detection and tracking in monocular images" Proceedings of the IEEE international conference on computer vision. (Year: 2015).*
Extended European Search Report dated Jul. 9, 2020 in European Patent Application No. 19306795.6, 10 pages
Jon Zubizarreta, et al. "A framework for augmented reality guidance in industry", The International Journal of Advanced Manufacturing Technoology, Springer, London, vol. 102, No. 9, Mar. 6, 2019, pp. 4095-4108, XP036790977, ISSN: 0268-3768, DOI:10.1007/S00170-019-03527-2 [retrieved on Mar. 6, 2019].
Liu Lifeng, et al, "A System Framework for Localization and Mapping using high Resolution Cameras of Mobile Devices", 2019 IEEE.CVF International Conference on Computer Vision Worshop (ICCVW), IEEE, Oct. 27, 2019, pp. 3796-3803, XP033732807, DOI: 10.1109/ICCVW.2019.00472 [retrieved on Mar. 2, 2020].
Joao Paulo Lima, et al. "Model Based Markerless 3D Tracking applied to Augmented Reality", SBC Journal on Interactive Systems, vol. I, Jan. 1, 2010, pp. 2-15, XP055407656, ISSN: 2236-3297.
Fakhreddi Ne Ababsa, et al, "Efficient initialization schemes for real-time 3D camera tracking using image sequences", Intelligent Systems Design and Applications (ISDA), 2011 11$^{th}$ International Conference, IEEE, Nov. 22, 2011, pp. 743-747, XP032086144, DOI: 10.1109/ISDA.2011.6121745 ISBN: 978-1-4577-1676-8.
Michael Hodlmoser, et al, Model-Based 1-15 Vehicle Pose Estimation and Tracking in Videos Using Random Forests, 2013 International Conference on 3D Vision, IEEE, Jun. 29, 2013, pp. 430-437, XP032480419, DOI: 10.1109/3DV.2013.63 [retrieved on Sep. 13, 2013].
Paul Viola, et al. "Alignment by Maximization of Mutual Information", International Journal of Computer Vision (IJCV), 1997.
G. Palma, et al., "Improving 2D-3D Registration by Mutual Information Using Gradient Maps", Eurographics Italian Chapter Conference, 2010.
H. Su, et al., "Render for CNN: Viewpoint Estimation in Images Using CNNs Trained with Rendered 3D Model Views", International Conference on Computer Vision (ICCV), 2015.
V. Lepetit, et al., "EPnP: An Accurate O(n) Solution to the PnP Problem", International Journal of Computer Vision (IJCV), 2008.
M.E. Leventon, et al., "Multiple View 2D-3D Mutual Information Registration", Image Understanding Workshop, 1997.
Z. Janko, et al., "Photo-Consistency Based Registration of an Uncalibrated Image Pair to a 3D Surface Model Using Genetic Algorithm", 3D Data Processing, Visualization and Transmission (3DPVT), 2004.
M. J. Clarkson, et al., "Using Photo-Consistency to Register 2D Optical Images of the Human Face to a 3D Surface Model", IEEE Transactions on Pattern Analysis and Machine Intelligence, vol. 23, No. 11, 2001.

* cited by examiner

AUGMENTING A VIDEO FLUX OF A REAL SCENE

CROSS-REFERENCE TO RELATED APPLICATIONS

This application claims priority under 35 U.S.C. § 119 or 365 to European Application No. 19306795.6, filed Dec. 31, 2019. The entire contents of the above application(s) are incorporated herein by reference.

FIELD

The disclosure relates to the field of computer programs and systems, and more specifically to a method, system and program for augmenting a video flux of a real scene comprising a real object.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context and other contexts, augmented reality is gaining wide importance. Augmented reality encompasses solutions to augment a video flux of a real scene comprising a real object. These solutions allow for example adding information to the display of the real object by the video flux. These solutions require knowing the pose of a 3D model of the real object with respect to the different 2D frames of the video flux, such that information associated to the 3D model can be added to the video flux so as to augment it. Indeed, in order to superimpose virtual models over the object, there is a need to know as accurately as possible where the object is located in the referential frame of the augmented reality system.

If the 3D model (e.g. a virtual 3D mesh) has the same texture as the real object in the image frames of the video flux, one existing solution is to synthesize virtual views of the object, and match key points between the virtual images and the real ones (such as FERN or SIFT descriptors). As key points on a virtual image correspond to known 3D points, some existing solutions comprise computing the pose using the EPnP algorithm. This is notably what is proposed in a paper by V. Lepetit, F. Moreno-Noguer, and P. Fua, *EPnP: An Accurate O(n) Solution to the PnP Problem*, In International Journal of Computer Vision (IJCV), 2008. However, it is very common that the 3D model has no texture (or a different texture from the real object displayed on the image), and this prevents computation of key points which is robust enough to yield an accurate pose. Moreover, the real object can be hard to segment in the image, which also prevents any reliable descriptors over the contour of the object. In such case, existing learning-based approaches can provide a solution by training a neural network to predict the right. However, such methods do not work well on real objects that were unseen during the training.

There is thus a need for an improved solution of augmented reality for augmenting a video flux of a real scene comprising a real object.

SUMMARY

It is therefore provided a computer-implemented method of augmented reality. The method is for augmenting a video flux of a real scene comprising a real object. The method comprises capturing the video flux with a video camera. The method also comprises extracting, from the video flux, one or more 2D images each representing the real object. The method also comprises providing a 3D model representing the real object. The method also comprises determining a pose of the 3D model relative to the video flux, among candidate poses. The determining rewards mutual information, for at least one 2D image and for each given candidate pose. The mutual information represents a mutual dependence between a virtual 2D rendering and the at least one 2D image. The virtual 2D rendering is a virtual 2D rendering of the 3D model with a value of the given candidate pose for the at least one 2D image. The method also comprises augmenting the video flux based on the pose.

The method may comprise one or more of the following:
- the one or more 2D images comprise several 2D images each corresponding to a respective frame of the video flux, the determining rewarding the mutual information for each 2D image of the several 2D images;
- the determining includes optimizing an objective function which comprises terms, each term rewarding the mutual information for a respective 2D image of the several 2D images;
- the objective function is a sum of the terms;
- each term is equal to the mutual information for the respective 2D image;
- the optimizing includes providing a number N of starting poses, where N>1;
- and running N times a non-differentiable iterative optimization algorithm on the objective function, each time starting from a respective one of the starting poses and outputting a respective resulting pose, and the determining includes computing the pose based on one of the N resulting poses;
- the determining further rewards a photo-consistency between projections on the several 2D images of one or more points of the 3D model;
- the determining includes within the computing, a pruning that performs said rewarding of the photo-consistency and outputs the one of the N resulting poses, and/or after the optimizing, a refinement that performs said rewarding of the photo-consistency;

the determining further rewards a match between a projection of 3D edges of the 3D model and 2D edges in at least one 2D image, the refinement optionally performing said rewarding of the match;

for each respective image of the at least one image, the 3D edges form a silhouette of the 3D model in the respective image;

the mutual information is a mutual information between a first variable extracted from the virtual 2D rendering, and a second variable extracted from the at least one 2D image, the first variable and the second variable representing a distribution on a pixel value range; and/or the distribution on the pixel value domain is a count of pixels having a value that belongs to one of predetermined sub-ranges.

It is further provided a computer program comprising instructions for performing the method.

It is further provided a computer readable storage medium having recorded thereon the computer program.

It is further provided a system comprising a processor coupled to a memory, the memory having recorded thereon the computer program.

BRIEF DESCRIPTION OF THE DRAWINGS

Embodiments of the disclosure will now be described, by way of non-limiting example, and in reference to the accompanying drawings, where.

DETAILED DESCRIPTION

It is described a computer-implemented method of augmented reality. The method is for augmenting a video flux of a real scene comprising a real object. The method comprises capturing the video flux with a video camera. The method also comprises extracting, from the video flux, one or more 2D images each representing the real object. The method also comprises providing a 3D model representing the real object. The method also comprises determining a pose of the 3D model relative to the video flux, among candidate poses. The determining (of the pose) rewards mutual information, for at least one 2D image and for each given candidate pose. The mutual information represents a mutual dependence between a virtual 2D rendering and the at least one 2D image. The virtual 2D rendering is a virtual 2D rendering of the 3D model with a value of the given candidate pose for the at least one 2D image. The method also comprises augmenting the video flux based on the (determined) pose.

Such a method forms an improved solution of augmented reality for augmenting a video flux of a real scene comprising a real object.

The method determines a pose of a 3D model representing a real object relative to a video flux of a real scene comprising said real object, the video flux being captured with a video camera. The method thus allows augmenting of the video flux based on the determined pose, for example according to any known method. The method thus offers capabilities of augmented reality solutions in the specific context of video flux capturing.

Now, the method determines the pose of the 3D model relative to the video flux in a particular manner. In specific, the determining of the pose by the method rewards a mutual information which represents a mutual dependence between the virtual 2D rendering of the 3D model for at least one 2D image extracted from the video flux, and said at least one 2D image itself. Thanks to such rewarding, the method determines a pose which is relatively consistent with the video flux. In other words, the method determines a pose which corresponds relatively accurately to the true pose parameters of the camera or to pose parameters which emulate these true pose parameters in an acceptable manner, in terms of augmented reality. Indeed, the mutual information captures a mutual dependence between one or more extracted image(s) and its (their) corresponding rendering(s) based on the pose. By rewarding such mutual information, the method makes the assumption that such a dependence must be verified to some extent, and this reveals to be true when assessing accuracy of results obtained by the method. Thus, the augmenting is also relatively accurate since it relies on the determined pose.

In addition, the method need not rely on any deterministic correlation between a texture of the 3D model and segmentations of the 2D image(s). Indeed, the method uses a statistical measure of similarity, namely the mutual information. This is enabled thanks to the consideration of 2D rendering(s) of the 3D model to obtain a format comparable with the 2D image(s). With such a statistical analysis, the method has enough information to be able to correlate the 3D model as rendered along candidate poses on the one hand, with the extracted 2D image(s) on the other hand. Thus, the 3D model may be untextured, or alternatively textured but with a texture uncorrelated to segmentations of 2D image(s), and/or the 2D image(s) may be un-segmentable (i.e. difficult or impossible to segment). Also, the mutual information (which has a probabilistic theoretic definition) has revealed during tests to provide more accurate results than solutions relying solely on a criterion having a non-probabilistic theoretic definition, such as the L2-norm, for example between the virtual 2D rendering(s) and its (their) corresponding extracted 2D image(s). Furthermore, the method need not rely on any pre-providing of a machine-learning dataset. Indeed, the pose determining of the method may be fully deterministic (i.e. executing a deterministic algorithm, i.e. which was not learnt and thus not a trained neural network).

The one or more (extracted) 2D images may comprise several 2D images (i.e. a plurality of 2D images) each corresponding to a respective frame of the video flux. In such a case, the determining may reward the mutual information for each such 2D image (i.e. for each image of/among the several 2D images). In other words, the rewarding is performed for each one of the extracted plurality of frames of the video flux that represent the real object. This allows exploiting relatively fully the richness of information provided by the video flux (for example compared to relying on a single extracted image frame). This improves accuracy and robustness of the method.

In particular, the several 2D images may comprise 2D images of the real object from different viewpoints. The different viewpoints may for example comprise different view angles of the real object. For that, the capturing may comprise moving (e.g. including turning) the camera in the scene (e.g. including around the real object) so as to capture video frames of the real object from different viewpoints (e.g. including different angles). In such a case, the method exploits the full spatial coverage of the real object allowed by the video flux capturing. This yet improves accuracy and robustness of the method. The extracted 2D image(s) may for example comprise a number of image(s) lower than 20 or 10 and/or higher than 2 or 3, and/or distributed on a time period longer than 1 or 5 seconds and/or lower than 1 minute or 30 seconds.

The real object may be a manufactured product of the real world and/or fixed/immobile. The real object may be a product in various and unlimited industrial fields, including: aerospace, architecture, construction, consumer goods, high-tech devices, industrial equipment, transportation, marine, and/or offshore oil/gas production or transportation. The real object may thus be an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging). The real scene may be any real-world environment where a physical instance of the real object is located.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the method is to perform the method with a system adapted for this purpose. The system may comprise a processor coupled to a memory, the memory having recorded thereon a computer program comprising instructions for performing the method. The memory may also store a database. The memory is any hardware adapted for such storage, possibly comprising several physical distinct parts (e.g. one for the program, and possibly one for the database).

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The system may comprise a display screen. The processor may be coupled to the display screen and configured for displaying the (e.g. augmented) video flux on the display screen. The method may further comprise, e.g. (substantially) real-time during the capturing of the video flux, displaying, on the display screen, the augmented video flux (i.e. the enhanced video flux as resulting from the augmenting step performed by the method). Alternatively, the displaying may be performed separately after the method.

The system may comprise the video camera. The camera may be coupled to the processor and configured for capturing the video flux. The capturing may for example be performed via user-interaction. The user may carry the camera and move the camera (e.g. around) in the scene to capture a video of the real object. The user may for instance hold the camera in their hands, or alternatively wear an accessory (e.g. glasses) on which the camera is mounted. The other steps of the method may be performed fully automatically, for example (substantially) in real-time while the video flux is captured.

The system may be configured for determining relative positions of the camera during its movement, for example by comprising sensors mounted on the camera or fixed relative to the camera. The sensors may be coupled to the processor and configured for determining relative positions during movement of the camera, so as to track position of the camera. The sensors may include motion and/or inertial sensors.

The system may for example comprise a mobile phone or a tablet programmed for AR (Augmented Reality), and/or AR glasses. Such systems may be configured for AR, as known per se from the field of augmented reality. The method may comprise, by a user, carrying such a system around in the scene to perform the capturing of the video with the video camera of the system, in the manner discussed above, as known per se from the field of augmented reality.

The method provides augmented reality by augmenting the video flux. By "augmenting the video flux", it is meant any operation that comprises computing a flux of graphisms to be superimposed (i.e. overlaid) on the video flux. The augmented video flux may comprise the video flux itself in full, to which the computed flux of graphisms is added (superimposed). This is the case for example if the system is a mobile phone or a tablet, and the displaying is performed on a screen of the mobile phone or tablet while being carried by the user to capture the video flux. Alternatively, the augmented video flux may be deprived from the video flux, and thereby consist in the mere computed flux of graphisms. This is the case for example if the system comprises transparent AR glasses, wherein the user need not see the initially captured video flux itself since the user is already seeing the reality through the AR glasses thanks to their transparency, such that only the computed flux of graphisms need be displayed on the glasses superimposed over the reality being seen. This is all known per se from the field of augmented reality and not further detailed in the present disclosure.

By "flux", it is hereby meant a succession (i.e. time-series) of images. The video flux is thus a set of successive 2D images representing a part of the real scene, each 2D image corresponding to (i.e. being) a respective frame of the video flux. The capturing may be performed continuously, such that two successive frames of the video flux may be close one to another (e.g. separated by less than 1 or 0.1 second).

By "extracting", it is hereby merely meant that the method selects one or more captured video frames that each contain a (full or partial) view of the real object, and provides, to the pose-determining step, 2D images that correspond to said frame(s). Each extracted 2D image may be a selected frame or a sub-part thereof which comprises the view of the real object. The method may comprise identifying each such sub-part in any manner. For example, the identifying may comprise defining a (e.g. rectangular) bounding box around said view of the real object, for example drawn by a user.

The 3D model is a 3D modeled object. A modeled object is any object defined by data stored e.g. in the database. By extension, the expression "modeled object" designates the data itself. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D model thus comprises specification of a 3D shape of the real object. The 3D shape may be defined or definable in a 3D referential frame. The specification may be under any format allowing the virtual 2D rendering(s) of the pose-determining. The 3D model may for example be a 3D mesh or any other 3D modeled object allowing computation of a 3D mesh, for example a boundary representation or B-Rep (wherein a B-Rep may be converted into a 3D mesh by a tessellation, as known per se from the field of CAD).

The 3D model may have been designed with a CAD system or may result from a design made with a CAD system. By CAD system, it is meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

The providing of the 3D model may be performed in any manner. The 3D model may for example be retrieved by a user or recognized automatically by the system, for example in a library of 3D models.

By "pose of the 3D model relative to the video flux", it is hereby referred to frame-by-frame pose parameters of the video camera relative to the 3D model, for example defined in the referential frame of the 3D model. The pose parameters are also known as "extrinsic parameters". A "value" of a pose for (i.e. relative to) an extracted 2D image is thus the value of the pose parameters for the frame of the video flux corresponding to said extracted 2D image.

As known per se from the field of computer vision, together with (frame-by-frame) intrinsic parameters of the video camera, the pose parameters allow projecting the 3D model in each frame of the video flux, and the method may comprise such a projection. Thanks to that, the video flux may be augmented based on the result of such a projection. The 3D model notably provides a mathematical representation of the 3D shape of the real object, and thereby allows adding to the video flux graphisms (such as text, numbers, and/or textures) stemming from calculations performed based on such mathematical representation. Alternatively or additionally, the 3D model may be associated with any type of data that may be used for the augmenting, for example for generating graphisms to be added to the video flux. The associated data may for example comprise metadata (e.g. in a database) linked to the 3D model or linked to different parts of the 3D model. The metadata may for example comprise a textual description or a textual specification linked to each part of the 3D model, in cases where the 3D model comprises different parts. The pose allows positioning said graphisms at correct locations of the video flux, relative to the view therein of the real object. This is all known per se from the field of augmented reality and not further detailed in the present disclosure.

The method determines such a pose accurately among candidate poses. This means that the pose is an unknown variable of the method, and the determining step outputs a calculated value for it. Here, the candidate poses merely refer to the explorable domain offered to the determining step. Since the pose determined by the method is accurate, the projection of the 3D model in each frame is also relatively accurate, in the sense that the projected 3D model matches well the 2D view of the real object in the frame. In other words, the pose defines a virtual position of the video camera relative to the 3D model, and thanks to the method, said virtual position accurately corresponds to the real position of the video camera relative to the real object.

The intrinsic parameters may (at least in part) similarly be considered as an unknown variable and determined by the method, for example within the pose-determining step (the determining performing the rewarding in such a case not only for each given candidate pose, but also for each given candidate frame-by-frame value of the intrinsic parameters). Alternatively, the intrinsic parameters may (at least in part) be predetermined and thus provided to the method, for example outputted by the camera itself (modern cameras usually provide their used intrinsic parameters). Yet alternatively, the method may set a constant and arbitrary value for the intrinsic parameters. This may lead to a slightly less accurate pose, but this still provides a relatively accurate projection result and thus reality augmenting.

In all these cases, the method outputs a flux of camera parameters relative to the video flux among candidate fluxes of camera parameters, each set of camera parameters corresponding to a respective frame of the video flux (the flux consisting in a succession of camera parameter sets). And the method may determine the outputted flux of camera parameters by rewarding, for at least one 2D image and for each given candidate flux of camera parameters, a mutual information representing a mutual dependence between a virtual 2D rendering of the 3D model with a value of the given candidate flux of camera parameters for the at least one 2D image (i.e. the set of camera parameters in the flux corresponding to the image), and the at least one 2D image.

The determining may perform the rewarding of the mutual information in any manner that allows penalizing a low value or score of the mutual information. In other words, the determining is configured to output for a given extracted 2D image, other things being equal (or ceteris paribus), the pose which leads to the highest value of the mutual information among all candidate poses. The method performs such rewarding for each extracted 2D image, and the method may perform other types or rewarding, such that the determined pose is generally not one that maximizes the mutual information for all 2D images, but it is one that globally provides a good score and thereby achieves relatively high accuracy of the augmenting.

A particular manner of implementing such a rewarding, that may be followed by the method, is to run an optimization program, that is, to have the determining include optimizing an objective function. An objective function comprises terms which reward different measures. In practice, such an optimization program may be executed as a minimization program including cost (or penalty) terms, each penalizing the inverse of the measure to reward.

The method may optimize the program with any type of optimization algorithm, for example by executing at least one run of an iterative optimization algorithm. The iterative optimization algorithm may start from a starting point (i.e. a starting pose, to be then optimized). Each iteration may comprise providing a current given candidate pose (initialized with the starting pose), and outputting a new candidate pose (for the next iteration) that improves the value of the objective function (e.g. that reduces it, in the case of a minimization program). The outputting of a new candidate pose may comprise computing the mutual information for the current candidate pose and/or for another candidate pose, and comparing the computed mutual information values for the current candidate pose and for another candidate pose. The computing of the mutual information may comprise computing the virtual 2D rendering of the 3D model.

In the case where the method extracts several images, the pose-determining of the method may include optimizing an objective function which comprises terms. Each term may then reward the mutual information for a respective 2D image of the several 2D images. In other words, each extracted 2D image may have its own rewarding term (e.g. cost term). This provides an efficient manner to implement the rewarding.

In specific, the objective function may be a sum of the terms. Alternatively or additionally, each term (respective to an extracted 2D image) may be equal to the mutual information for the respective 2D image. This allows a robust and efficient convergence of the optimization. This has notably proved to provide accurate results, even in case a part of the extracted 2D images are of bad quality.

The method may comprise tracking relative pose of the video camera in any known manner, for example based on the earlier-mentioned sensors (modern AR systems usually provide such functionality based on such sensors). In such a case, the relative pose of the 3D model between different frames is known. The pose-determining may thus consist in initializing the value of the pose of the 3D model relative to the video flux based on the extracted one or more 2D images, the remaining values of the pose being determined based on the initialized value and the relative pose tracking. As a result, the method may be restricted to determine an initial pose in order to know the full pose of the 3D model, and therefore be able to perform the augmenting throughout the whole video flux capturing. Alternatively or additionally, in the case where the method extracts several images and the determining rewards the mutual information for each such image, the pose-determining may consider as an unknown variable the value of each given candidate pose for only one 2D image (for example the first one, chronologically speaking), the values of the pose of the other images being defined by variables as a function of the unknown variable and the relative pose tracking.

The video camera may take an RGB video flux, or alternatively a greyscale video flux. In case the initially taken video flux is an RGB video flux, the method may optionally comprise converting the video flux into a greyscale video flux, such that the extracted 2D images are greyscale images. Alternatively, the method may comprise converting only the selected video frames or only their sub-parts into greyscale images, such that here again the extracted 2D images are greyscale images. This improves efficiency of the method, since color information is ignored (such ignoring being particularly relevant in case the 3D model does not convey correct color information or even no color information at all, for example if it is non-textured, and/or in the case of a 2D rendering based on shading, which as such does not take into account any texture even if there is one).

Now, the method considers mutual information representing a mutual dependence between a virtual 2D rendering of the 3D model with a pose value, and a corresponding 2D image. The term "virtual" merely refers to the fact that the 2D rendering need not be outputted by the method. The virtual 2D rendering of the 3D model may consist in any generation of a photorealistic 2D image of the 3D model from the viewpoint defined by the pose value. The virtual 2D rendering may be further based on camera intrinsic parameters (either predetermined to the method or determined by the method, as mentioned above). The generation of the virtual 2D rendering may include any rasterization and/or shading, such as the application of a Phong shader or of a normal map shader.

As known per se from the field of probability theory and information theory, mutual information of two variables is a measure of a mutual dependence between the two variables. This concept is detailed in textbook Cover, T. M.; Thomas, J. A. (1991), *Elements of Information Theory* (Wiley ed.), chapter 2, and also at the Website accessible at the following URL: https://en.wikipedia.org/wiki/Mutual_information. The content of this textbook and the content of this Website (at the time of the priority date of the present patent application) are incorporated herein by reference, and the mutual information rewarded by the pose-determining of the method may be as defined therein, i.e. consist in the Kullback-Leibler divergence.

In particular, the mutual information may be a mutual information between a first variable extracted from the virtual 2D rendering, and a second variable extracted from the at least one 2D image, and the first variable and the second variable may represent a distribution on a pixel value range. The mutual information may notably be the mutual information (Kullback-Leibler divergence) of a joint distribution on such a pixel value range. In a specific example, the distribution on the pixel value domain may be a count of pixels having a value that belongs to one of predetermined sub-ranges. The sub-ranges (or "bins") may form a subdivision of the range of values taken by each pixel. The subdivision may be regular. In practice, the subdivision may comprise a number of bins higher than 5 or 10, and/or lower than 100 or 50, for example of the order of 20.

Optional features of the method are now discussed with reference to the example shown on FIG. 1.

The method of the example comprises capturing S10 a video flux with a video camera. The method of the example then comprises extracting S20, from the video flux, several 2D images each representing the real object. In parallel, the method of the example comprises providing S30 a 3D model representing the real object. The method of the example then comprises determining S40-S80 a pose of the 3D model relative to the video flux. The determining S40-S80 rewards the mutual information for each 2D image of the several 2D images, thanks to the objective function at S50 comprising terms each rewarding a mutual information for a respective 2D image (such as, for example, the earlier-mentioned sum). The method of the example finally comprises augmenting S90 the video flux based on the pose. In addition to the mutual information, the pose-determining may further reward a photo-consistency between projections on the several 2D images of one or more points of the 3D model. Yet in addition to the mutual information, the pose-determining may further reward a match between a projection of 3D edges of the 3D model and 2D edges in at least one 2D image. Rewarding these further criteria improves accuracy of the determined pose. Such criteria (photo-consistency and edge-matching) are used in the prior art as the sole and primary criteria for determining the pose. By using the mutual information as a primary and statistical criterion instead, the pose-determining of the method converges much faster toward a relatively accurate result. Yet, the method of the example still uses the other criteria as secondary criteria, in order to improve efficiency, but in a second stage (after an optimization based on the mutual information is ran). This overall achieves accuracy, robustness, and high speed.

The photo-consistency criterion may amount to assume that the final pose must be such that the 2D points resulting from the projection (according to said final pose) of specific 3D points of the 3D model on the several 2D images (i.e. all such existing 2D points, depending on the visibility of the corresponding 3D points image-by-image) must be graphically consistent, meaning that they must correspond to locations of the 2D images presenting the same local graphical features. Graphical consistency may be measured by applying to such 2D points of different images at least one graphical descriptor which may be rotation-invariant, and comparing the values of the graphical descriptor across the 2D image. The graphical descriptor may optionally also be invariant to luminosity changes and/or differentiable. The graphical descriptor may be selected among a predetermined set of one or more graphical descriptors, for example including the SIFT descriptor, the FERN descriptor, and/or (simply) the pixel color. The 3D points may stem from a sampling of the 3D model, performed in any manner, for example randomly. The method may reward photo-consistency at different stages, and the at least graphical descriptor may be different at each such stage.

The edge-matching criterion may amount to assume that the final pose must be such that specific 3D edges of the 3D model project (according to said final pose) on specific 2D edges of at least one of the extracted 2D images, for example each extracted 2D image. The 3D edges may for example be those that form the silhouette of the 3D model in each image (according to the value of said final pose for said image). The silhouette of the 3D model is the contour of the 3D model according to the pose. The 2D edges of an image are also called "contours", and the method may determine a contour map in any known manner, for example with a trained neural network, or by computation of a Chamfer map of the result of a Canny edge detection. The contour map may be a contour probability map (i.e. each pixel is assigned a probability of being a contour).

The optimizing may include providing S40 a (predetermined) number N of starting poses, where N>1 (in other words, a plurality of starting points for the optimization to be run later at S50). The providing S40 may be performed in any manner, specific implementations being discussed later. The optimizing may then include running S50 N times a (e.g. same) iterative optimization algorithm on the objective function (i.e. an algorithm that optimizes said objective function), each time starting from a respective one of the starting poses, and each time outputting a respective resulting pose. In practice, N may be higher than 10 or 20 and/or lower than 100 or 50.

The method may then compute the (final) pose based on one of the N resulting poses, via S60-S80 in the shown example. This allows reducing risks associated to accidentally inaccurate results provided by the potential fall of the algorithm in a local extremum. In particular, due to the problem at hand, the optimization algorithm may be non-differentiable (the method may for example run the Nelder-Mead algorithm). Such non-differentiability yields the above-mentioned risks.

The computing S60-S80 may comprise keeping S60 a (predetermined) number k of optimized poses among the N runs, where k<N. In other words, the method may identify the k best results among the N resulting poses outputted by S50 (e.g. the k poses that minimize the objective function). In practice, k may be higher than 2 or 3 and/or lower than 20 or 10. The other resulting poses may be discarded at this stage, only the selected k results being inputted to the pruning S70. Alternatively, the method may skip S60 and thereby input all the N resulting poses to the pruning S70.

Inputting more than only the best resulting pose outputted by S50 allows reducing risks associated to accidentally inaccurate results. Such inaccurate results may occur if relying only on the mutual information, due to the mutual information being a statistical measurement and thereby involving ambiguities (for example in the case of a symmetry). Step S60 similarly reduces risks associated to accidentally inaccurate results (compared to inputting all the N resulting poses to the pruning S70), this time due to the photo-consistency criterion of the pruning S70 potentially leading to an accidental choice of a pose not satisfying enough with respect to the mutual information.

The computing S60-S80 may comprise a pruning S70 of the N resulting poses, to output a single pose (then inputted to step S70). The pruning S70 is shown separate from S60, but S60 may equivalently be considered as part of the pruning. In the shown example, the pruning S70 consists in selecting a best pose among the k optimized poses outputted by S60, by rewarding the earlier-described photo-consistency. For example, the pruning S70 may select the one pose performing the best against the photo-consistency criterion, among the k optimized poses. This may include sampling the 3D model, and then evaluating the photo-consistency criterion for each of the k poses (e.g. including computing any earlier-mentioned descriptor for each 2D point resulting from projection of a sampled 3D point, such as the SIFT descriptor).

The computing S60-S80 may then comprise performing a refinement S80 of the pose outputted by S70, and the refined pose may be considered as the final determined pose and inputted to S90 for augmenting the video flux.

The refinement S80 may reward the earlier-described photo-consistency (which is hereby put at use again) and/or the 2D-edge-3D-edge matching, for example both these criteria. The refinement S80 may for example minimize a global error. The global error may comprise a first term penalizing an error between the projected contour of the 3D model—e.g. virtual mesh-on each of the 2D images—i.e. 2D views- and detected edges of the real object in said 2D images, and/or a second term penalizing an error between the value of the descriptor(s) across the different 2D images at the 2D points corresponding to the—e.g. sampled-3D points. In the case of an edge-matching rewarding based on a contour probability map as described above, the first term may penalize lowness of contour probability of the 2D pixels on which the 3D edges (e.g. corresponding to the silhouette) project. In the case of a photo-consistency rewarding based on a graphical descriptor as described above, the second term may penalize a difference between the value of the graphical descriptor on the projections of the (e.g. sampled) 3D points across the 2D images. The minimizing may be gradient-based. This improves efficiency. In such a case, the graphical descriptor may be differentiable, such as the pixel-color.

Figure 2:
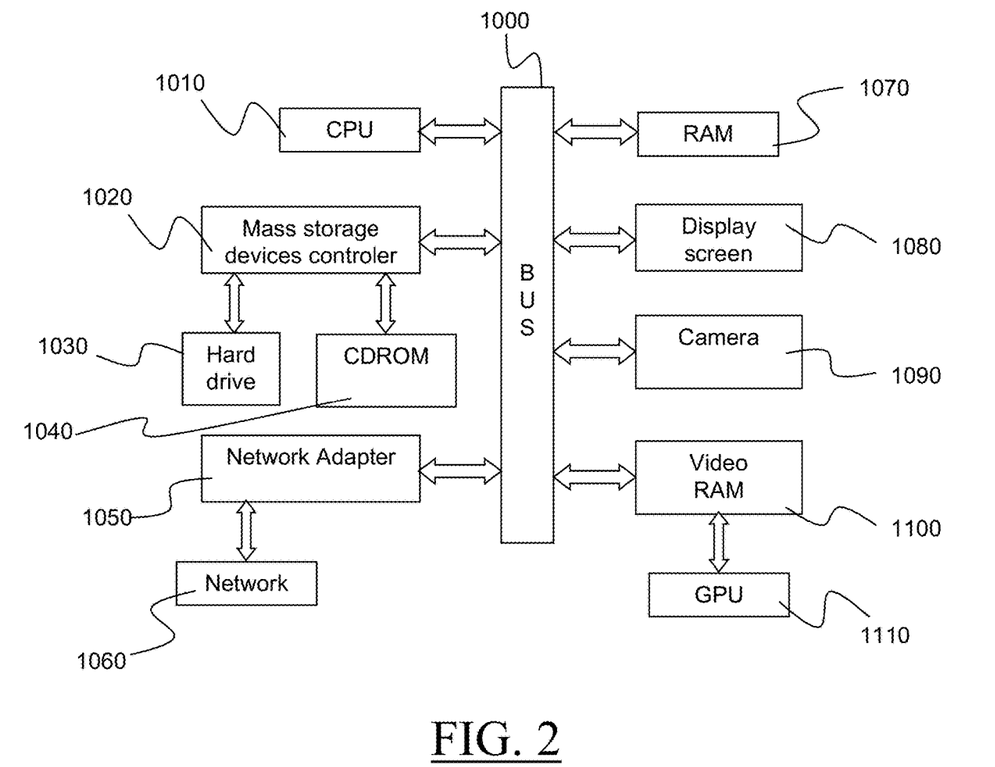
FIG. 2 shows an example of the system.

FIG. 2 shows an example of the system.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a display screen 1080 and a camera 1090.

Figure 1:
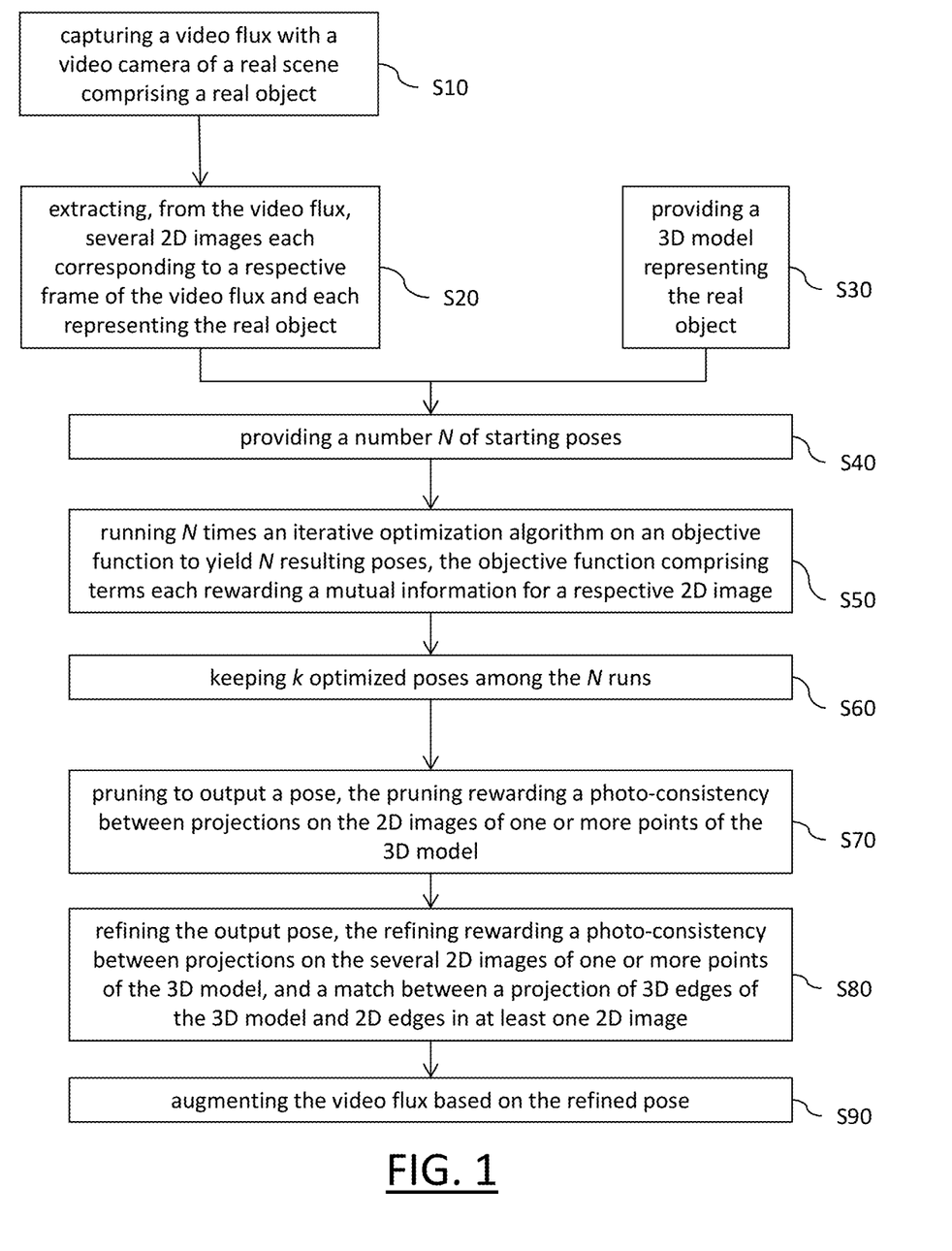
FIG. 1 shows a flowchart of an example of the method.

Implementations of the method in line with the example of FIG. 1 are now discussed.

These implementations of the method aim at computing the pose (and possibly the intrinsic parameters) of a camera taking different views of a known 3D object. By "known", it is meant that the system owns an (e.g. untextured) 3D model (e.g. a 3D mesh) representing the object. Moreover, it is here assumed that the implementations of the method lie in the context of an augmented reality system, wherein the system knows the relative pose between the different views taken by the camera.

The implementations of the method rely on the definition of a pose-dependent energy based on the mutual information between virtual renderings the real images. This energy is discretized among several poses (e.g. taken on the Thomson sphere). The implementations of the method optimize this energy to find the best possible poses. Then, the implementations of the method prune the wrong poses by exploiting a photo-consistency criterion. Finally, the implementations of the method fine-tune the pose by fitting onto the edges of the images.

The implementations of the method are able to compute the pose even when the segmentation is impossible or inaccurate, and when the texture of the object is unknown. Besides, as the implementations of the method combine both mutual information method, a photo-consistency criterion, and a silhouette/contour matching, in a multi-view framework, they can remove the ambiguities and obtain a more accurate pose. The implementations of the method leverage all views at once in the mutual information optimization, without any bias towards any view. Moreover, the implementations of the method locally refine the pose with a photo-consistency criterion as well as a matching of the projected silhouettes of the 3D model onto the nearest contours in the images. Finally, the implementations of the method do not rely on any dataset/machine-learning algorithm.

Let $I_1, \ldots, I_n$ be n real images, and $R_i$ be the known relative rigid transformation between $I_1$ and $I_i$ ($R_1=Id_{3\times 3}$), i.e. the transformation from the frame $I_1$ to the frame $I_i$. Let $\mathcal{M}$ be a mesh of an object appearing in all the views $I_1, \ldots, I_n$. A goal may be to compute the pose $\hat{P}$ of the mesh $\mathcal{M}$ in the view $I_1$, where the pose is defined as the composition of a projection with a rigid transformation (rotation and translation).

Let $T_i(P)$ be the pose matrix of the view $I_i$ as given by the pose P of the frame $I_1$, i.e., if $P=KR$ with K the projection matrix, and R the rigid transformation from the mesh frame to the $I_1$ frame, then $T_i(P)=KR_iR$.

The implementations of the method may comprise providing the part of the image $I_1$ where the object is located. For example, the user may draw a bounding box around it.

Multi-View Optimization

Pre-Processing

First of all, the implementations of the method may pre-process the images $I_1, \ldots, I_n$ to convert them into a greyscale luma space. Then, the implementations of the method may equalize the histogram of each image. Each pixel color is a one-dimensional integer belonging to [0,255].

Once all images are converted, the implementations of the method may sample $P_1, \ldots, P_N$ poses, in any manner.

For example if an approximation $\tilde{P}$ of the sought pose $\hat{P}$ is known, as this is often the case in augmented reality where the user can take a picture $I_1$ at an approximate known location with respect to $\mathcal{M}$, the implementations of the method may sample $P_1, \ldots, P_N$ around $\tilde{P}$.

For example if such an approximation is not known, the implementations of the method may sample points on a Thomson sphere around the mesh, and take as rigid transformations for $P_1, \ldots, P_N$ the camera located at one sampled point on the sphere and looking at the center. The radius of the Thomson sphere as well as the translation in the optical plane of the camera may be set such that the projected bounding box $\mathcal{M}$ equals the expected position of the object in the image $I_1$.

If the intrinsic parameters (focal and principal points) of the real camera are known, the implementations of the method may use these for the intrinsic matrix. If they are unknown, the implementations of the method may initialize the principal point to be at the center of the image, and the focal as (width+height)/2 where width and height are the width and height of the image $I_1$. These intrinsic parameters may be optimized together with the pose, or alternatively be fixed.

Mutual Information Definition

Let $f$ be a function which maps a pose P to a virtual rendering (colored or greyscale) of the mesh $\mathcal{M}$ taken with the pose P. For example, the implementations of the method may use a Phong shader in $f$ to render the mesh $\mathcal{M}$, or alternatively a normal map shader. In that case, the color of each pixel belongs to $[0,255]^3$. The implementations of the method may also impose $f$ to generate views of the same resolution than the resolution of the real images.

Given a pair of images $(J_1, J_2)$, and $c_1$ and $c_2$ be the number of channels of $J_1$ and $J_2$, $\mathbb{P}_H$ denotes the joint histogram of the multi-channel colors distribution of the input images $(J_1, J_2)$. Namely, the implementations of the method may concatenate the second image as additional channels to the first image, and see the pair as a new image with the channels of both the first and second input images. The number of bins in each channel of the histogram may be anything between 2 and the number of possible colors. In practice, the implementations of the method may use 20 bins to get a meaningful histogram that remains accurate. That means that the implementations of the method may uniformly divide the interval $[0,255]^{c_1+c_2}$ into $20^{c_1+c_2}$ sub-intervals, and for each sub-interval, the implementations of the method may count the number of pixels (e.g. normalized by the total number of pixels) whose multi-channel color belongs to this sub-interval (wherein the color of a pixel in the joint image $(J_1, J_2)$ belongs to $[0,255]^{c_1+c_2}$).

The implementations of the method may marginalize the distribution H over the second image to get the distribution $\mathbb{P}_{H_1}$ of the colors in the image $J_1$ only, and similarly the implementations of the method may consider the distribution $\mathbb{P}_{H_2}$ of the colors in the image $J_2$ only. If X is a random variable following the joint distribution $\mathbb{P}_H$, then $\mathbb{P}_{H_1}$ is the distribution of $X_{1,\ldots,c_1}$ and $\mathbb{P}_{H_2}$ the distribution of $X_{c_1+1,\ldots,c_2}$.

Finally, let D be the mutual information of the joint distribution $\mathbb{P}_H$:

$$D(J_1, J_2) = \sum_{x \in J_1} \sum_{y \in J_2} \mathbb{P}_H(x, y) \log\left(\frac{\mathbb{P}_H(x, y)}{\mathbb{P}_{H_1}(x)\mathbb{P}_{H_2}(y)}\right)$$

Such mutual information is the Kullback-Leibler divergence between the joint distribution and the marginal distributions of colors in $J_1$ and $J_2$. If the color distribution in $J_1$ and $J_2$ are independent, then $D(J_1, J_2)=0$, whereas the more the colors in $J_1$ and $J_2$ are linked, the higher the mutual information gets. It is always non-negative and symmetric. When the colors in $J_2$ are function of the colors $J_1$, then the mutual information is the highest, and equals to the entropy of $J_1$.

It is noticed that the mutual information does not characterize a linear relationship between the colors of $J_1$ and $J_2$ (unlike the correlation). It is a value that describes how well one can infer the colors of $J_2$ knowing the colors in $J_1$, i.e. how stochastically dependent are the colors in $J_1$ and $J_2$.

Mutual Information Optimization

To compute the best pose $\hat{P}$, the implementations of the method may maximize the mutual information between the virtual renderings and the real images. Indeed, if the mesh $\mathcal{M}$ is well aligned, then the colors in the virtual renderings should be strongly dependent with the colors in the real images, even if there is no simple affine transformation to match the color spaces of the virtual and real images, as the implementations of the method may not know the real texture of the mesh.

That is why the implementations of the method may minimize the following energy:

$$E_1(P) = -\sum_{i=1}^{n} D(I_i, f(T_i(P)))$$

To minimize $E_1(P)$ and avoid poor local minima, the implementations of the method may run N optimizations starting from $P_1, \ldots, P_N$. The optimization may be done with any algorithm. The implementations of the method may in an efficient example use Nelder-Mead (such as in the later-discussed tested implementation).

The implementations of the method may keep the k (k=5 in the tested implementation) best optimized poses among the N runs, denoted $\hat{P_1}, \ldots, \hat{P_k}$.

Figure 3:
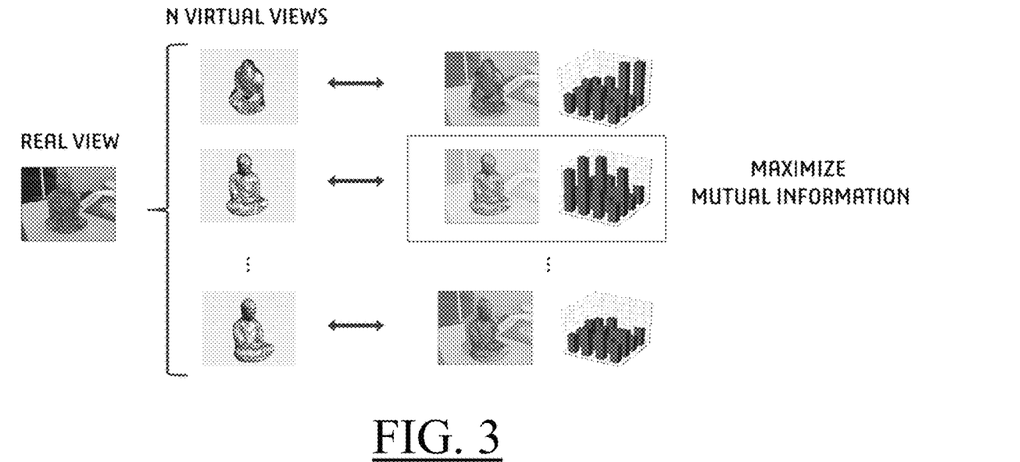
FIGS. 3-4 illustrate the method.

This is illustrated by FIG. 3.

Poses Pruning

From now, the implementations of the method may work with the original images $I_1, \ldots, I_n$, without any pre-processing.

In order to select the best pose among $\hat{P_1}, \ldots, \hat{P_k}$ and avoid the ambiguities, the implementations of the method may use a photo-consistency criterion.

Let $x_1, \ldots, x_m$ be a sampling of m points over the mesh $\mathcal{M}$, and $n_1, \ldots, n_m$ their corresponding normal. Let $s(x, I)$ be a function which maps a 2D coordinate x on an image I onto a local descriptor, e.g. (ideally) invariant to changes in illumination and orientation. $s(x, I)$ may be as simple as the color $I(x)$ itself, or may take a local neighborhood into account as done with the SIFT descriptor, but may also be extracted with a pre-trained neural network.

Finally, let $O_i(P) = \{j \in \{1, \ldots, n\} | x_i \text{ is visible in } I_j\}$. $O_i$ may be simply computed through a Z-buffer of $\mathcal{M}$ in each pose $T_j(P)$. Let $\mathbb{O} = \{i | \text{card}(O_i(P)) > 1\}$.

The implementations of the method may choose the best pose among $\hat{P_1}, \ldots, \hat{P_k}$ as the one minimizing $$E_2(P) = \frac{1}{\text{card}(\mathbb{O})} \sum_{i \in \mathbb{O}} \frac{1}{\sum_{j \in O_i(P)} \rho(T_j(P), n_i)} \sum_{j \in O_i(P)} \rho(T_j(P), n_i) \times \sigma[s(T_j(P)x_i, I_j) - \bar{s}(x_i)]$$

where $\sigma$ is a penalization function like a L2 norm, $\rho$ is a weighting function that underweights the energy the more when the normal $n_i$ at the point is orthogonal to eye vector of the camera (as given by the pose $PR_j$), and $\bar{s}(x_i)$ is the mean value of the descriptor in all images where $x_1$ is visible:

$$\bar{s}(x_i) = \frac{1}{\sum_{j \in O_i(P)} \rho(T_j(P), n_i)} \sum_{j \in O_i(P)} \rho(T_j(P), n_i) \times s(T_j(P)x_i, I_j).$$

$\hat{P}$ denotes the most consistent pose among $\hat{P_1}, \ldots, \hat{P_k}$ found with this criterion.

Figure 4:
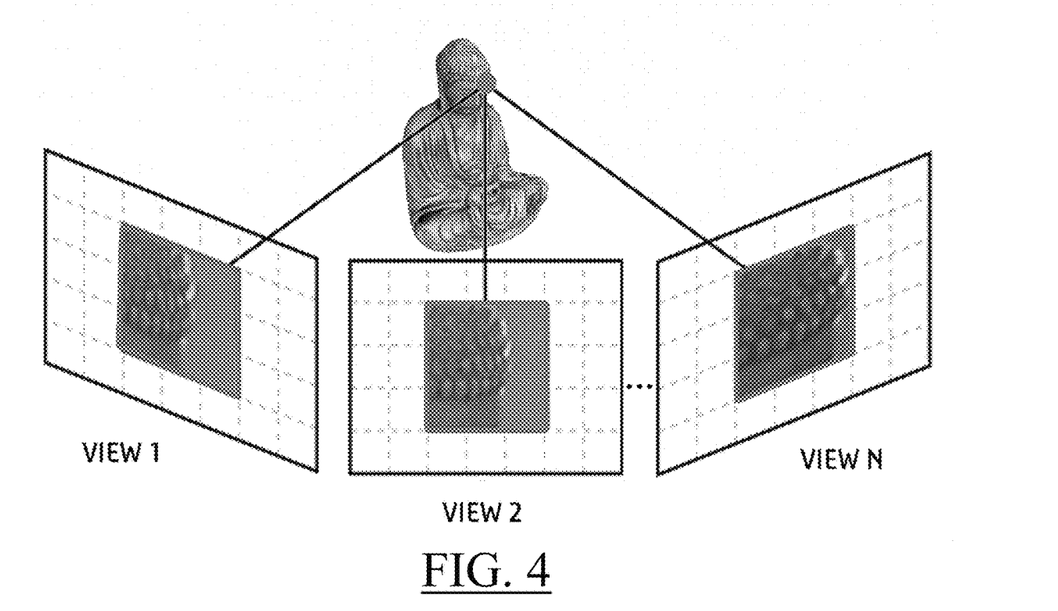

This is illustrated by FIG. 4.

Pose Refinement

Finally, the implementations of the method may refine $\hat{P}$ by minimizing a local color-based and edge-based energy, to increase the photo-consistency and match the edges between the contour of the projected mesh $\mathcal{M}$ and the edges in the images.

First, the implementations of the method may normalize each image $I_j$, for example to have zero mean and variance 1 in the domain of the projected mesh $T_j(\hat{P})\mathcal{M}$, in order to bring invariance to illumination to the pixels' colors. Other normalizations can be considered.

Let $\sigma$ be a loss which penalizes the difference between two colors $c_1, c_2 \in \mathbb{R}^3$, for example a L2 norm or $$\sigma(c_1 - c_2) = \frac{\epsilon^2}{\epsilon^2 + \|c_1 - c_2\|_2^2}.$$

Let $J_j$ a smoothed image of the edges of $I_j$ (e.g. the prediction of a neural network, or a Chamfer map of a Canny edges detection, or a Chamfer map with the squared distances). Let $S_j(P)$ be the 3D points onto $\mathcal{M}$ that project onto the silhouette of $\mathcal{M}$ in the view $T_j(P)$.

The implementations of the method may refine the pose $\hat{P}$ by minimizing, starting from $\hat{P}$, the following energy:

$$E_3(P) = \frac{1}{m}\sum_{i=1}^{m} \frac{1}{\sum_{j \in O_i(P)} \rho(T_j(P), n_i)} \sum_{j \in O_i(P)} \rho(T_j(P), n_i) \times \sigma\left[I_j(T_j(P)x_i) - \bar{I}(x_i)\right] - \frac{\alpha}{n}\sum_{j=1}^{n} \frac{1}{|S_j(P)|} \sum_{y \in S_j(P)} J_j(T_j(P)y),$$

where $$\bar{I}(x_i) = \frac{1}{\sum_{j \in O_i(P)} \rho(T_j(P), n_i)} \sum_{j \in O_i(P)} \rho(T_j(P), n_i) \times I_j(T_j(P)x_i).$$

This minimization may be handled by any differentiable optimization, the Jacobian of the pixels' colors with respect to their location in the image being given by a Sobel filter.

Figure 5:
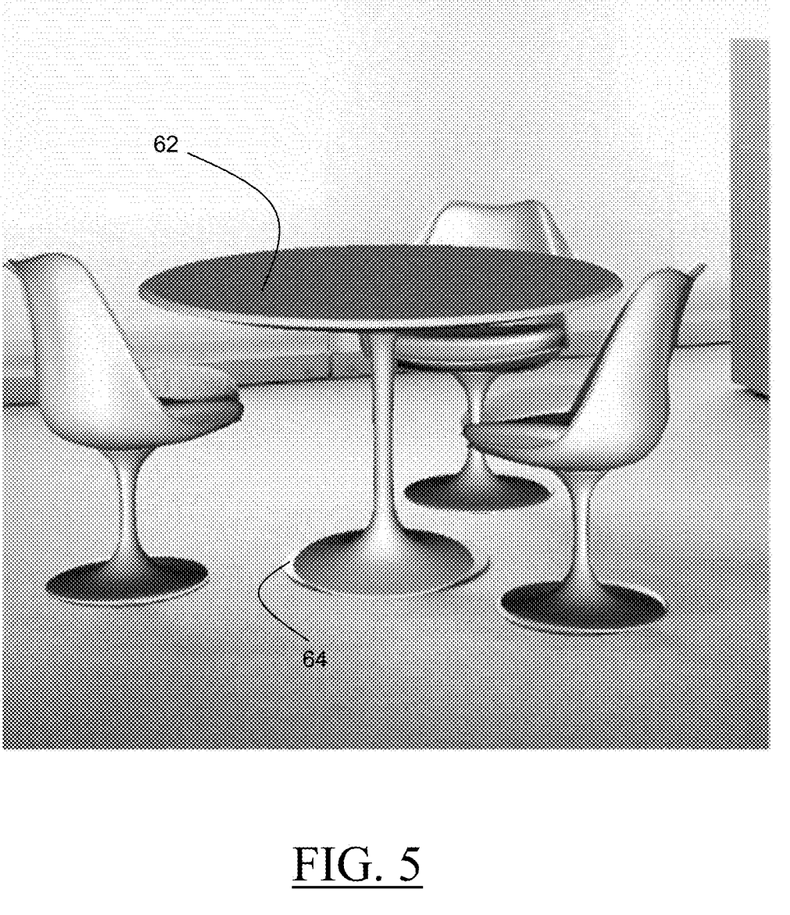
FIGS. 5-6 show results obtained with the method.
Figure 6:
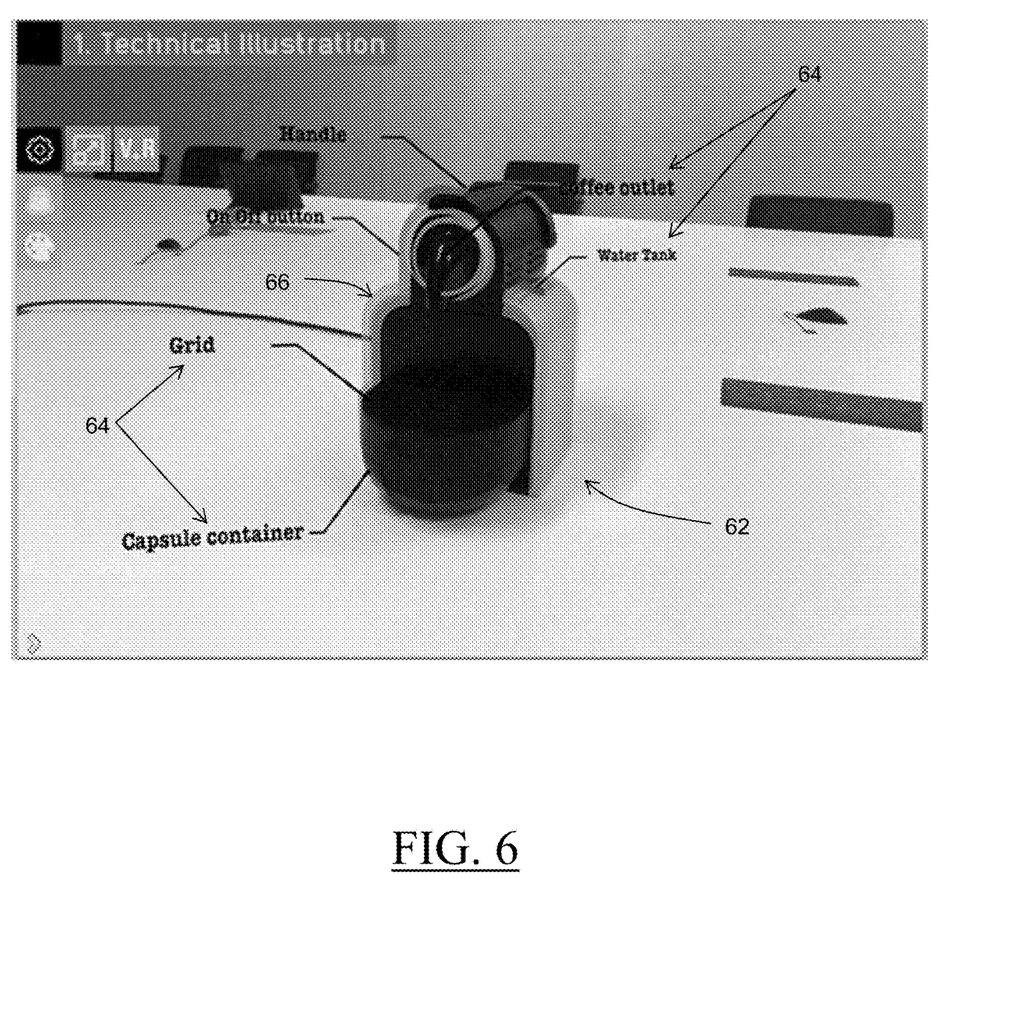

FIGS. 5-6 show results obtained with a tested implementation of the method in line with FIG. 1 and with the formulas provided for the discussed implementations of the method.

FIG. 5 shows how a 2D frame of a video flux of a scene comprising a table and chairs could be accurately augmented by the method with a projection of the 3D models thereof. As can be seen, the error between the graphical representation 64 of the table on the 2D frame and the 3D model 62 of the table is relatively small.

FIG. 6 shows how the method could be used to accurately augment a video flux of a scene comprising a coffee maker 62 with textual descriptions 64 of different parts of the coffee maker, associated to a 3D model of the coffee maker in the database. On FIG. 6, a projection 66 of the 3D model of the coffee maker is also displayed in a translucid manner, superimposed on the 2D view of the coffee maker in the image.

The invention claimed is:

1. A computer-implemented method of augmented reality for augmenting a video flux of a real scene including a real object, the method comprising:
    capturing the video flux with a video camera;
    extracting, from the video flux, one or more 2D images each representing the real object;
    obtaining a 3D model representing the real object;
    determining a pose of the 3D model relative to the video flux among candidate poses, the determining rewarding, for at least one 2D image and for each given candidate pose, mutual information representing a mutual dependence between:
        a virtual 2D rendering of the 3D model with a value of the given candidate pose for the at least one 2D image, and
        the at least one 2D image; and
    augmenting the video flux based on the pose,
    wherein the mutual information consists of a Kullback-Leibler divergence, and
    wherein one of: a) the 3D model is untextured, b) the 3D model is textured but with a texture uncorrelated to segmentations of the one or more 2D images, and c) the one or more 2D images is unsegmentable,
    wherein the mutual information is the Kullback-Leibler divergence between:
        a joint distribution on a pixel value range extracted from a concatenation of the virtual 2D rendering and the at least one 2D image, and
        a first marginal distribution on a pixel value range extracted from the virtual 2D rendering, and a second marginal distribution on a pixel value range extracted from the at least one 2D image.

2. The method of claim 1, wherein the one or more 2D images include several 2D images each corresponding to a respective frame of the video flux, the determining rewarding the mutual information for each 2D image of the several 2D images.

3. The method of claim 2, wherein the determining includes optimizing an objective function which includes terms, each term rewarding the mutual information for a respective 2D image of the several 2D images.

4. The method of claim 3, wherein the objective function is a sum of the terms.

5. The method of claim 4, wherein each term is equal to the mutual information for the respective 2D image.

6. The method of claim 3, wherein:
    the optimizing includes:
        obtaining a number N of starting poses, where N>1; and
        running N times a non-differentiable iterative optimization algorithm on the objective function, each time starting from a respective one of the starting poses and outputting a respective resulting pose; and
    the determining includes:
        computing the pose based on one of the N resulting poses.

7. The method of claim 2, wherein the determining further rewards a photo-consistency between projections on the several 2D images of one or more points of the 3D model.

8. The method of claim 6, wherein the determining includes:
    within the computing, a pruning that performs rewarding of photo-consistency and outputs the one of the N resulting poses, and/or
    after optimizing, a refinement that performs said rewarding of the photo-consistency.

9. The method of claim 1, wherein the determining further rewards a match between a projection of 3D edges of the 3D model and 2D edges in at least one 2D image and further includes a refinement performing said rewarding of the match.

10. The method of claim 9, wherein, for each respective image of the at least one 2D image, the 3D edges form a silhouette of the 3D model in the respective image.

11. The method of claim 1, wherein the mutual information is mutual information between:
   a first variable extracted from the virtual 2D rendering, and
   a second variable extracted from the at least one 2D image,
   the first variable and the second variable representing a distribution on a pixel value range.

12. The method of claim 11, wherein the distribution on the pixel value range is a count of pixels having a value that belongs to one of predetermined sub-ranges.

13. The method of claim 1, wherein the one or more 2D images extracted from the video flux are each greyscale.

14. The method of claim 1, wherein the Kullback-Leibler divergence is expressed as:

$$D(J_1, J_2) = \sum_{x \in J_1} \sum_{y \in J_2} \mathbb{P}_H(x, y) \log\left(\frac{\mathbb{P}_H(x, y)}{\mathbb{P}_{H_1}(x) \mathbb{P}_{H_2}(y)}\right),$$

and $J_1$ and $J_2$ denote the at least one 2D image and the virtual 2D rendering, $\mathbb{P}_H$ denotes the joint distribution, $\mathbb{P}_{H_1}$ denotes the first marginal distribution, and $\mathbb{P}_{H_2}$ denotes the second marginal distribution.

15. A non-transitory computer readable storage medium having recorded thereon a computer program including instructions for performing a computer-implemented method of augmented reality for augmenting a video flux of a real scene including a real object, the method comprising:
   capturing the video flux with a video camera;
   extracting, from the video flux, one or more 2D images each representing the real object;
   obtaining a 3D model representing the real object;
   determining a pose of the 3D model relative to the video flux among candidate poses, the determining rewarding, for at least one 2D image and for each given candidate pose, a mutual information representing a mutual dependence between:
      a virtual 2D rendering of the 3D model with a value of the given candidate pose for the at least one 2D image, and
      the at least one 2D image; and
   augmenting the video flux based on the pose,
   wherein the mutual information consists of a Kullback-Leibler divergence, and
   wherein one of: a) the 3D model is untextured, b) the 3D model is textured but with a texture uncorrelated to segmentations of the one or more 2D images, and c) the one or more 2D images is unsegmentable,
   wherein the mutual information is the Kullback-Leibler divergence between:
      a joint distribution on a pixel value range extracted from a concatenation of the virtual 2D rendering and the at least one 2D image, and
      a first marginal distribution on a pixel value range extracted from the virtual 2D rendering, and a second marginal distribution on a pixel value range extracted from the at least one 2D image.

16. The non-transitory computer readable storage medium of claim 15, wherein the one or more 2D images include several 2D images each corresponding to a respective frame of the video flux, the determining rewarding the mutual information for each 2D image of the several 2D images.

17. The non-transitory computer readable storage medium of claim 16, wherein the determining includes optimizing an objective function which includes terms, each term rewarding the mutual information for a respective 2D image of the several 2D images.

18. The non-transitory computer readable storage medium of claim 17, wherein the objective function is a sum of the terms.

19. A system comprising:
   a processor coupled to a memory, the memory having recorded thereon a computer program including instructions for augmenting a video flux of a real scene including a real object, that when executed by the processor causes the processor to be configured to:
   capture the video flux with a video camera,
   extract, from the video flux, one or more 2D images each representing the real object,
   obtain a 3D model representing the real object,
   determine a pose of the 3D model relative to the video flux among candidate poses, the determination rewarding, for at least one 2D image and for each given candidate pose, a mutual information representing a mutual dependence between:
      a virtual 2D rendering of the 3D model with a value of the given candidate pose for the at least one 2D image, and
      the at least one 2D image, and
   augment the video flux based on the pose,
   wherein the mutual information consists of a Kullback-Leibler divergence, and
   wherein one of: a) the 3D model is untextured, b) the 3D model is textured but with a texture uncorrelated to segmentations of the one or more 2D images, and c) the one or more 2D images is unsegmentable,
   wherein the mutual information is the Kullback-Leibler divergence between:
      a joint distribution on a pixel value range extracted from a concatenation of the virtual 2D rendering and the at least one 2D image, and
      a first marginal distribution on a pixel value range extracted from the virtual 2D rendering, and a second marginal distribution on a pixel value range extracted from the at least one 2D image.

20. The system of claim 19, wherein the one or more 2D images include several 2D images each corresponding to a respective frame of the video flux, the determination rewarding the mutual information for each 2D image of the several 2D images.

21. The system of claim 20, wherein the processor is further configured to determine the pose by being configured to optimize an objective function which includes terms, each term rewarding the mutual information for a respective 2D image of the several 2D images.

22. The system of claim 21, wherein the objective function is a sum of the terms.

* * * * *